US008670868B2

(12) United States Patent
Emmertz et al.

(10) Patent No.: US 8,670,868 B2
(45) Date of Patent: Mar. 11, 2014

(54) SYSTEM AND A METHOD FOR PROVIDING SAFE REMOTE ACCESS TO A ROBOT CONTROLLER (71) Applicants: Bertil Emmertz, Vasteras (SE); Jean-Christophe Alt, Eaubonne (FR); Steve Murphy, Hovas (SE)

(72) Inventors: Bertil Emmertz, Vasteras (SE); Jean-Christophe Alt, Eaubonne (FR); Steve Murphy, Hovas (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/770,812

(22) Filed: Feb. 19, 2013

(65) Prior Publication Data
US 2013/0158708 A1 Jun. 20, 2013

Related U.S. Application Data (63) Continuation of application No. PCT/EP2010/062083, filed on Aug. 19, 2010.

(51) Int. Cl.
G05B 19/418 (2006.01)

(52) U.S. Cl.
USPC .......................... 700/248; 700/245; 700/247

(58) Field of Classification Search
USPC ........... 700/245, 247, 248; 713/155; 380/277; 709/225
See application file for complete search history.

(56) References Cited

U.S. PATENT DOCUMENTS 6,189,032 B1   2/2001   Susaki et al.
6,218,802 B1   4/2001   Onoue et al.
2006/0095158 A1*  5/2006   Lee et al. ...................... 700/245
2008/0121097 A1*  5/2008   Rudakevych et al. ....... 89/28.05
2008/0201582 A1   8/2008   Jachmann et al.
2009/0164039 A1   6/2009   Jung et al.
2010/0077217 A1*  3/2010   Callaghan ..................... 713/175

FOREIGN PATENT DOCUMENTS

EP   1582950 A2   10/2005

OTHER PUBLICATIONS

International Search Report and Written Opinion of the International Searching Authority Application No. PCT/EP2010/062083 Completed: Aug. 8, 2011; Mailing Date: Aug. 17, 2011 11 pages.

* cited by examiner

Primary Examiner — Khoi Tran
Assistant Examiner — Spencer Patton
(74) Attorney, Agent, or Firm — St. Onge Steward Johnston & Reens LLC (57) ABSTRACT The present invention relates to a system and a method for providing safe remote access to a plurality of robot controllers positioned at a local site for a person positioned on a remote site. The system includes a plurality of robot controllers, each capable of receiving credentials and including an authentication component for authentication of the credentials, and an authorization component for handling authorization for access to the robot controller based on the result of the authentication, a remote computer located at a remote site and capable of communicating with the robot controllers and having an interface capable of receiving credentials and configured to send the credentials to the robot controllers, a server component capable of communicating with the robot controllers, and an identifying component positioned at the local site configured to receive proof of local access.

21 Claims, 3 Drawing Sheets

SYSTEM AND A METHOD FOR PROVIDING SAFE REMOTE ACCESS TO A ROBOT CONTROLLER

FIELD OF THE INVENTION

The present invention relates to a system and a method for providing safe remote access to a plurality of robot controllers positioned at a local site for a person positioned on a remote site.

BACKGROUND OF THE INVENTION

An industrial robot includes a robot controller for controlling the motions of the robot and often also a portable programming unit, usually denoted a teach pendant unit, designed for programming and monitoring of the robot operations. Robot controllers have the ability to control motion and I/O signals and have abilities to create and edit internal configurations and programs that affect the operation of the robot while programming and during operation in productions. These abilities are broken down into functions with privileges allocated to each set. For example, an I/O function has privileges to read signals, write signals, and create or delete signals. Similarly a program function has a set of privileges for reading, writing, updating, and deleting programs, among others.

Different persons when using the controller are given different sets of privileges for accessing the functions of the controller. One user might have the privilege to change I/O signals but not change programs, while another user may have privileges for accessing all functions of the controller. In some cases, accessing certain functions includes an element of physical safety. The ability to change to start or stop robot motion can affect physical safety of a person if that person is in the vicinity of the robot. Similarly, the ability to change an I/O signal can affect peripheral equipment on and around the robot and can affect the safety of the individual in the robot cell.

Commonly the users of the robot are organized into groups; each group is assigned a set of functions and privileges for those functions. To access a controller function and the privileges, most robot controllers provide an interface for receiving credentials in the form of username and password, an authentication component for authentication of the credentials, and an authorization component for handling authorization for access to the robot controller functions and their privileges based on the result of the authentication. This system works well when the user is physically present in, or near the robot cell.

Robot controllers and production cells are complex devices where many things can go wrong and where the configuration and program can be very complex. Experienced service technicians are needed most times that one debugs or modifies a robot and its program and configuration. It is very expensive and ineffective in a large production environment and in a global robot service organization to have to send specialized service engineers to be physically present near the robot cell in order to perform service or updates and modifications. It is thereby advantageous to provide some form of remote access to a controller and its functions so that specialists need not travel to all the different robot sites.

Often, a plurality of robot controllers is connected to a common local network. The local network can be connected to the Internet. Many types of robot controllers are provided with a web server and have the technical possibility for allowing access to the controller over the Internet. Thus, it is possible to provide remote service and assistance of the robot via the Internet. However, in such cases it is important to ensure that access to the robot controller functions takes into account the safety of the persons working and equipment in and about the robot in the cell. As robot controllers control physical mechanics and I/O signals, remote access entails higher risk in that the remote person cannot see all that is going on in the robot cell. In addition, remote access may occur at a time when there are people physically present in the robot cell or when the robot is working in production. It is of benefit if the operator of the robot cell has local control over the remote access. Further, the operator should be able to restrict access to the time period during which the service engineer needs access to the robot controller functions. The problem faced is how to allow remote access to the robot controller functions under controlled circumstances.

The systems used today rely upon a user name and password in order to allow access to the controller. A problem with user names and passwords is that these are complex to administer for a plurality of robot controllers. In addition, robot controllers often have inaccurate clocks and administering multiple robots each with different user names and passwords and with different expiration times become burdensome. Furthermore, the user name and password also must be transmitted to the remote service engineer over a secure line and this could be difficult as well as expensive. In order to make sure that there can be no access to the controller at other times, it is often necessary to use hardware to connect and disconnect the Internet connection, which is an expensive solution. In addition, it is desired to be able to allow access to a set of robots at the same time.

If access is to be allowed to only some or one of the robot controllers connected to the network, different passwords must be used for providing access to different controllers. If the system contains a large number of robots it is troublesome to handle the large number of passwords needed for accessing the controllers.

SUMMARY OF THE INVENTION

The object of the present invention is to provide a system and a method for enabling remote access to functions of the robot controllers in a controlled manner.

This object is achieved by a system for providing safe remote access to a plurality of robot controllers positioned at a local site for a person positioned at a remote site.

The system is characterized in that it further comprises a server component capable of communicating with the robot controllers and an identifying component positioned at the local site capable of communicating with the server component and configured to receive proof of local access to one or more of the robot controllers and to send information on the local access to the server component, and in that the server component is configured to authorize access to the robot controllers based on information on local access received from the identifying component, and the authorization component of the robot controller is configured to allow the remote computer access to functions of the robot controllers when credentials have been authenticated and when access has been authorized by the server component.

When the term "access to the robot controller(s)" is used in the present application it shall be understood to refer to access to one or more functions of the robot controller(s), such as the I/O function and/or the program function.

In this system, it is not enough to have authorized credentials to gain remote access to the robot controller functions. An operator on the local site must also give his approval to allow the remote computer access to the robot controllers' functions. The approval is given by providing proof of local access to one or more of the controllers. The providing of proof of local access is a confirmation of physical presences to one or more of the controllers. The person giving the approval must be physically on the local site in order to be able to give his approval. Accordingly, the safety of the local personnel and equipment can be verified by the local operator before access is allowed. Further, the demand on proof of local access before allowing remote access to the controllers' functions is helpful in preventing modifications and changes to a robot controller unknown to the robot operator.

Another advantage is that this system prevents former employees, former service engineers, and other non-authorized individuals in possession of credentials from accessing the controllers and their functions. Accordingly, a more safe and secure access to the controllers is achieved. A further advantage achieved with the invention is that the person on the local site may control when the person on the remote site is allowed access to the controllers depending on the situation on the local site. For example, if the production is in a critical phase, it is not suitable to let the service engine provide service on the controllers.

According to the invention, one server component administers the authorization of access to all of the connected robot controllers. This dramatically reduces the administrative burden for the operator of the robots as one does not have to access each robot in turn but can authorize remote access to multiple robot controllers.

With credentials is meant any type of information which can be used as evidence of entitlement to log in to the controllers. Possible credentials can include but are not limited to: password and username, a smart card, biometric identification, tokens, or digitally signed files. Many other types of credentials are possible. Authentication is a process to validate the credentials in order to confirm a user.

The identifying component is configured to receive proof of local access to one or more of the robot controllers and signal confirmation to the server component. This could be done directly or via the robot controller. Thus, the identifying component should be designed so that it is only possible to provide proof of local access for a person who is physically present on the local site and has physical access to one or more of the robot controllers. The identifying component can be positioned anywhere on the local site within reach of a person working on the local site, for example, on the robot controller, on the portable programming unit, or on a wall in the building housing the robot controllers. It is also possible to have more than one identifying component. The identifying component can, for example, include a physical button, a soft button on an interface on the portable programming unit, a USB interface, or a card reader.

According to an embodiment of the invention, the system is configured to authorize access to the robot controllers' functions during a defined time limit. This can be done either via the server component or via the robot controllers. This embodiment makes it possible for the operator to allow a time-limited remote access to the robot controllers' functions. For example, one can limit access to controller functions only during evenings and weekends.

According to an embodiment of the invention, the system is configured to not authorize access to the robot controllers upon receiving an order that access to the controllers is no longer permitted. This can be done either via the server component or the via the robot controllers. This embodiment enables the owner or customer to cancel the access to the controllers, for example when service of the controllers has been finished or when the robot must be put back into production immediately.

According to an embodiment of the invention, the authentication component can be configured to authenticate the credentials in dependence on information on a time limit for the credentials. In this embodiment a time limit is set for the credentials, thereby enabling a time-limited remote access to the robot controllers. For example, a service engineer might be given credentials that only last for two weeks from the date of issuance.

According to an embodiment of the invention, the authentication component is configured to authenticate using multiple sets of credentials. One set of credentials may include references to other required credentials. For example, one may require a digitally signed document and a valid username and password as credentials where the digitally signed document contains the allowed username or other identifier for the person trying access the controllers' functions. The authentication component is configured to only authorize access to the controllers to persons who have been allowed access to the robot controller in the digitally signed document. This embodiment helps prevent non-authorized persons from accessing the robot controllers.

According to an embodiment of the invention, the system comprises data storage for storing a list of robot controllers to which remote access is to be allowed, and said server component is configured to authorize access to the robot controllers based on the information on local access received from the identifying component and the stored list of robot controllers to which remote access are to be allowed. This embodiment makes it possible to select to which of the controllers access is to be allowed. Thus, it is possible to allow access to only some of the robot controllers or to only one controller, without using different passwords for different controllers. The same credentials can be used for all of the controllers in the system.

According to an embodiment of the invention, said list includes information on who is allowed remote access to the robot controllers and to which of the robot controllers access is allowed, and the server component is configured to authorize access to the robot controllers based on the information on who is allowed remote access and to which of the robot controllers. This embodiment makes it possible to allow different people access to different controllers.

According to an embodiment of the invention, for at least one of the robot controller on said list, the list includes information on a time period during which access to the robot controller is allowed, and the server component is configured to authorize access to the robot controller based on the time period specified in the list. This embodiment makes it easy for the customer to specify a time limit during which access to a certain controller is allowed.

According to an embodiment of the invention, the server component contains a server authentication module configured to receive credentials and to authorize actions on the server component based on the received server credentials, and the system further comprises a second computer capable of communicating with the server component and capable of receiving server credentials, and the second computer is configured to send the credentials to the server component, and capable of creating said list of robot controllers for which remote access is to be allowed and to provide the server component with the list. With server credentials is meant any type of information which can be used as evidence of entitlement to log in to the server component and utilize its functions. This embodiment makes it possible for the operator to create the list of robot controllers for which remote access is to be allowed and to provide the server component with the list in a secure way.

According to an embodiment of the invention, the remote computer is configured to receive the above list and to send the list to the robot controllers as credentials, and the authentication components are configured to carry out the authentication based on the received list from the remote computer. For example, the list from the server component is transferred to the user of the remote computer, and the list is used as the credentials for remote access to the robot controllers. In this embodiment, the list of robot controllers for which remote access is to be allowed is used as the credentials for requesting access to the robot controllers. The owner can authorize the remote access without having to send sensitive data, such as username and password in clear text over email or have to call in this data to a service engineer. If the list includes information on who is allowed remote access to the robot controllers then an unauthorized individual cannot simply intercept the transmission of the list and use it to gain access to the robot controllers' functions. This embodiment helps to overcome the disadvantages with using password and username as credentials.

According to an embodiment of the invention, the server component is configured to digitally sign the list by using a key, and the authentication component, which is authenticating the credentials of the service engineer, is configured to authenticate the list using a key. The key may be any of different types of encryption keys, where public-private keys are preferred. This embodiment further increases the security of the system by ensuring that the list came from the server component and was not changed when transmitted to the user of the remote computer.

According to an embodiment of the invention, the proof of local access is presence of said list locally to one or more of the controllers, and the identifying component is configured to authenticate the list and to signal to the server component that physical local access has been confirmed. Local access is proven when the list is accessible for the identifying component and the identifying component has authenticated the list. The list can be efficiently transferred to the local components via a transportable media such as USB and does not require additional hardware components on most robot controllers. In addition, a valid list can only be obtained from the server component, thus increasing the security of the local access authorization. This embodiment helps prevent unauthorized persons from providing proof of local access.

According to an embodiment of the invention, the server component is configured to digitally sign the list by using a key, and the identifying component is configured to authenticate the list using the key. The keys may be any of different types of encryption keys, where public-private keys are preferred. This embodiment further increases the security of the system by ensuring that the list came from the server component and was not modified before being used as proof of local access.

According to an embodiment of the invention, the identifying component is located on or in close vicinity to one of the robot controllers.

According to an embodiment of the invention, at least one of the robot controllers includes said identifying component and the identifying component is configured to receive proof of local access from a physical interface on the robot controller. This embodiment enhances the safety of the system as one must have robot access and has no additional cost to the robot cell.

According to an embodiment of the invention, the system comprises a server computer and the server component is located on the server computer. This embodiment allows one to separate robot controllers from the server component where robot controllers can be added and removed without affecting the safe remote access system.

According to an embodiment of the invention, the server component is located on one of the robot controllers. This embodiment reduces the costs of servers when very few robot controllers are used.

According to an embodiment of the invention, the component for authentication of the credentials is located at the server computer. This embodiment reduces the costs of administering the public and private keys and the costs of updates to the authentication component.

According to another aspect of the invention, this object is achieved by a method for providing safe remote access to a plurality of robot controllers.

The method comprises:
sending credentials from the remote computer to at least one of the robot controllers,
providing authentication of the credentials,
receiving proof of local access to at least one of the robot controllers,
authorizing access to the robot controllers based on the received proof of local access, and
allowing the remote computer access to the robot controllers' functions when credentials have been authenticated and when local access to the robot controllers have been authorized.

The proof of local access must be provided by a person present on the local site having physical access to at least one of the robot controllers. Providing proof of local access also means giving his approval to remote access to the robot controllers.

BRIEF DESCRIPTION OF THE DRAWINGS

The invention will now be explained more closely by the description of different embodiments of the invention and with reference to the appended figures.

DETAILED DESCRIPTION OF THE INVENTION

Figure 1:
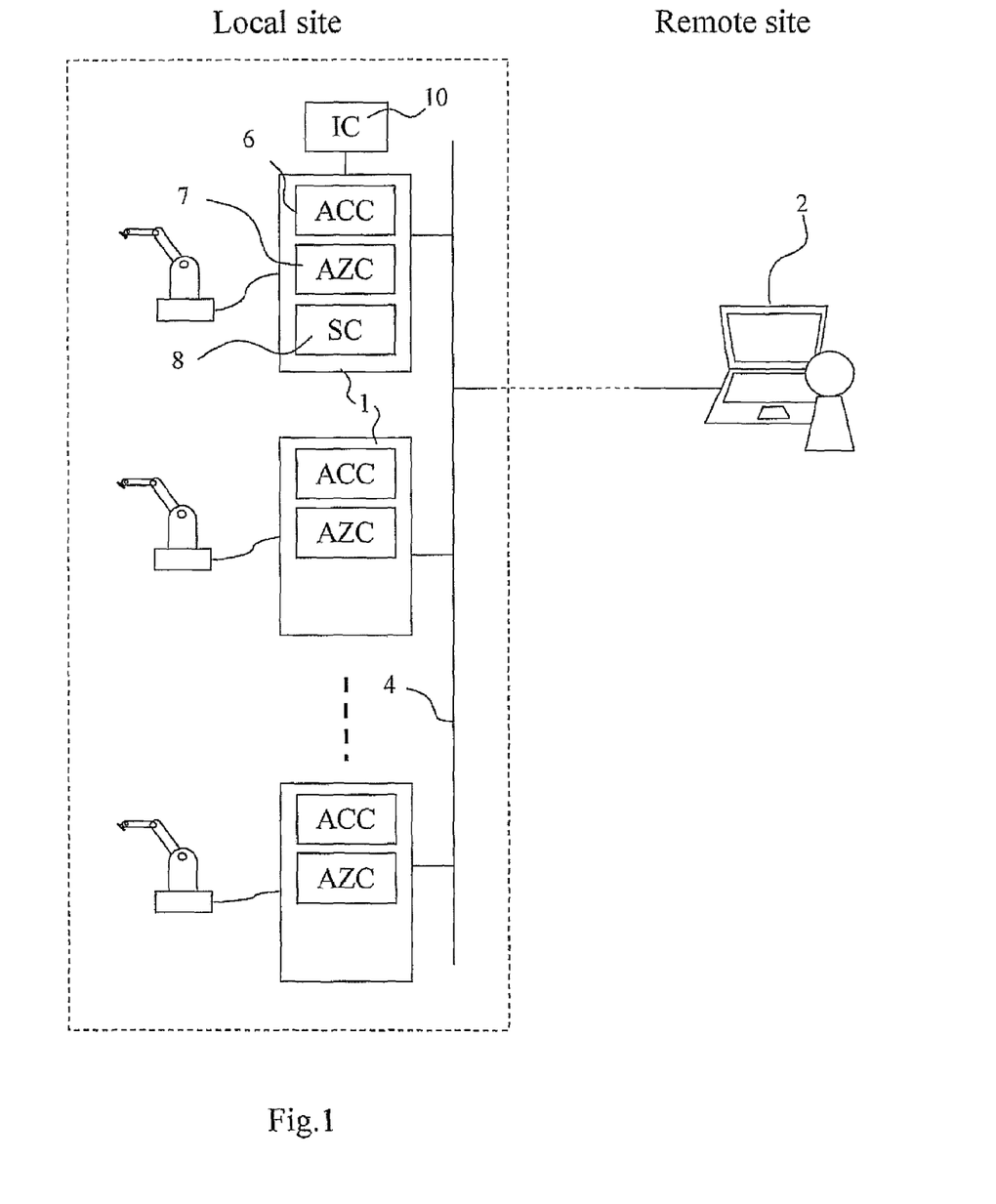
FIG. 1 shows a system for providing safe remote access according to an embodiment of the invention.

FIG. 1 shows a system for providing safe remote access to functions of a plurality of robot controllers 1 according to an embodiment of the invention. The system includes a plurality of robots and robot controllers for controlling the robots. Each controller may have a portable programming unit, usually denoted a teach pendant unit, designed for programming and monitoring the robot operations. The robots are positioned at a local site, for example, in a factory. Service of the robots, including installation and commissioning tasks often requires that a knowledgeable service engineer has access to service, installation, and commissioning interfaces on the robot controllers. The service engineer is often a person provided by the robot supplier and located at a remote service center. The service engineer is provided with a remote computer 2 located at the remote site and capable of communicating with the robot controllers via a network. Normally, the remote computer 2 is a laptop PC, which has a special client tool designed to interface to the controllers and to present user interfaces necessary for service, installation, and commissioning. In some cases, the client tool may be as simple as a web browser and the robot controller is equipped with a web server component, in other cases the client tool may be a complete PC program that communicates with the robot controller using proprietary or public protocols.

Given that the robot controllers may be physically spread over the local site, and that the desired knowledgeable service engineer may not be physically on-site at the time of the service need or trouble, it is very advantageous to connect the robots in a factory network 4 to allow access for individuals with access to the factory network. The factory network may contain multiple devices. Access to the robot controllers can be made over the factory network or other direct networks, such as GPRS. The factory network 4 in turn may be connected to other networks, such as the Internet, and the service engineer may be located on such other network, and can use any one of existing technologies, such as VPN and open VPN to securely connect from the laptop PC 2 to the factory network. This also includes modem and dial-up systems. The full range of solutions for connecting networks securely is known to practitioners in the art.

The issue for the owner and operator of the robots in the production line is that access to the individual robots via the network represents a risk to production equipment, and to individual safety. An unauthorized individual may stop production by changing the robot configuration or program, an individual remote from the controller may inadvertently change the state of a signal controlled by the robot and cause a personal safety issue. To address these risks, each of the robot controllers 1 is equipped with an authentication component 6 and an authorization component 7 that restrict access to the controller and its functions. Each of the controllers is capable of receiving credentials via the network 4 and the authentication component is configured to provide authentication of the credentials, i.e to validate the credentials in order to confirm that the person trying to log in to the controller is authorized. In an embodiment of the invention, the authentication component is configured to authenticate the credentials during a defined time limit for the credentials. If the time limit has lapsed, the credentials are no longer valid.

The authorization component is configured to handle authorization for access to the functions of the robot controller based on the result of the authentication. The computer 2 located at a remote site is capable of receiving credentials from a user, for example the service engineer, and configured to send the received credentials to a robot controller in order to log in to the robot controller. The credentials are, for example, a username and a password.

The system further comprises a server component 8 capable of communicating with the robot controllers via the network 4. In this embodiment the server component 8 is located on one of the robot controllers 1.

The system also comprises an identifying component 10 positioned at the local site and capable of communicating with the server component 8. The identifying component 10 is configured to receive proof of local access to the robot controllers and to send information on the local access to the server component 8. In this embodiment, the identifying component 10 is located on a physical unit connected to one of the robot controllers. The physical unit is, for example, a portable programming unit, or an input device configured to read an identifier from a data carrier and to transfer the identifier to the robot controller. The input device is, for example, a card reader, or a device including an interface for receiving a USB memory. The identifier is, for example, a password or a signed list. For example, the input device is configured to read a signed file from the data carrier and to transfer the signed file to the robot controller. A person working on the local site can provide proof of local access to the controllers, for example, by entering a password to the portable programming unit, or enter a card including an identifier, such as a signed list, in the card reader, or enter a USB memory including an identifier in the USB interface. The robot controller is configured to receive the proof of local access from the identifying component 10 and to send information to the server component 8 regarding the received proof of local access.

In another embodiment, the server component 8 may be located on a server computer. In this case, the identifying component may communicate with the server component via the robot controller.

The server component 8 is configured to authorize access to the robot controllers 1 when it has received the information on local access from the identifying component. The authorization components 7 of the robot controllers must ask the server component for permission before allowing the remote computer 2 access to the robot controller. Thus, the authorization component is configured to allow the remote computer access to the robot controller when credentials have been authenticated and when access has been authorized by the server component. In an embodiment of the invention, access to the robot controller is no longer authorized upon receiving an order from a local person that access to the controller is no longer permitted. For example, the local person may send a message to the server component from the teach pendant unit to inform the server component that local access is not permitted any longer. If a push button is used to confirm local access, it is possible to configure the identifying component so that the first time the button is pushed local access is confirmed and the second time the button is pushed access is no longer permitted.

Figure 2:
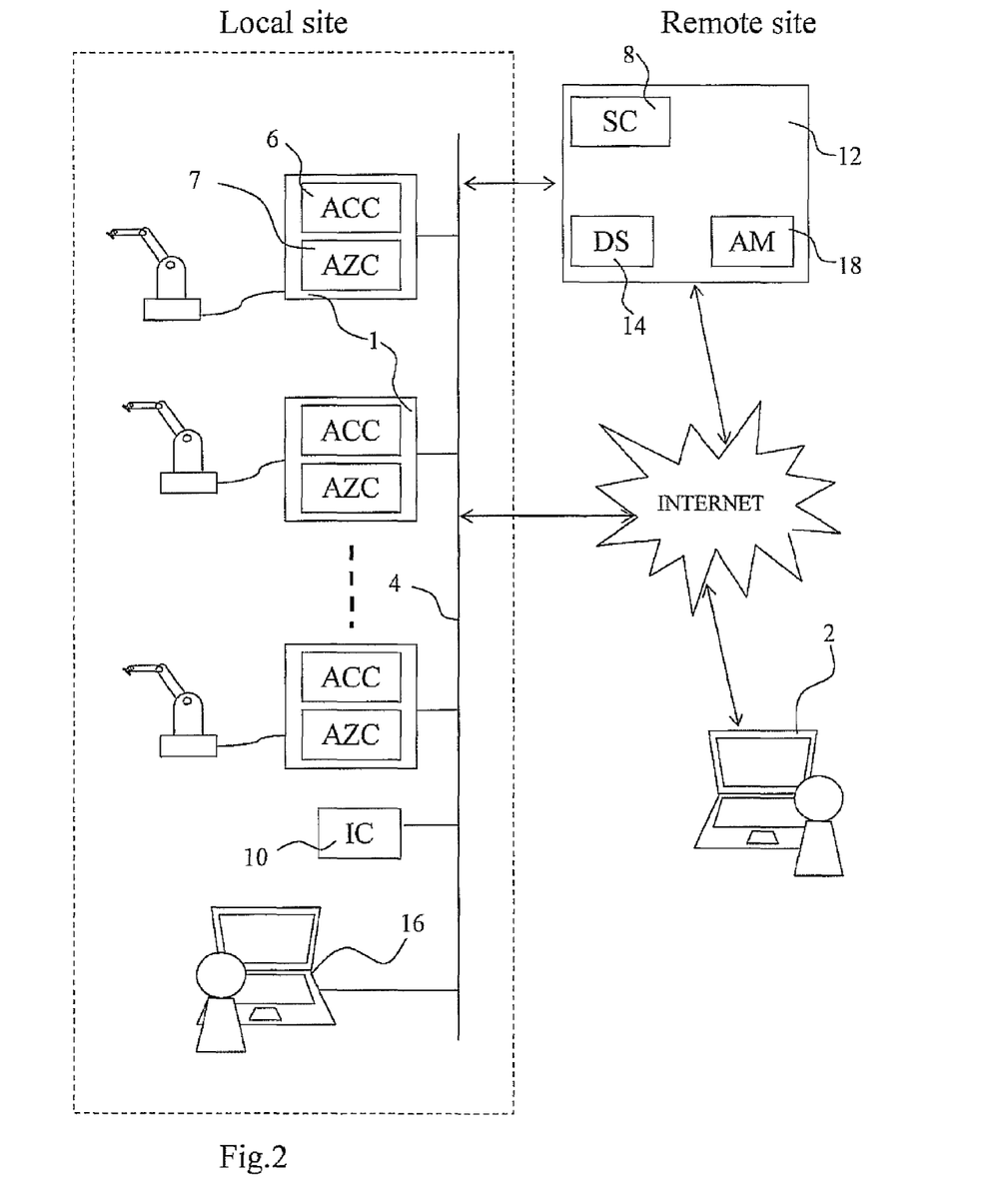
FIG. 2 shows a system for providing safe remote access according to a second embodiment of the invention.

FIG. 2 shows a system for providing safe remote access according to a second embodiment of the invention. This embodiment differs from the first embodiment in that the system comprises a server computer 12 and the server component 8 is arranged on the server computer. The server computer is configured to communicate with the robot controllers 1 via the local network 4. The server computer also comprises data storage 14 for storing a list of robot controllers to which remote access are to be allowed. Preferably, the list is signed by the server component. The server component is configured to send the signed list the remote computer. The server component is configured to authorize access to the robot controllers based on the information on local access received from the identifying component and the stored list of robot controllers to which remote access are to be allowed. Remote access is only allowed to controllers on the list.

In the embodiments disclosed only one remote computer is shown. However, there can be many remote computers. It is also possible that different users use the same remote computer. Different persons may have access to different controllers. In those cases it can be useful to decide who is allowed remote access and to which robot controllers. The list may further include information on who is allowed remote access to the robot controllers, and to which of the robot controllers access is allowed. In this case the robot controller must forward information on who is asking for permission to access the controller to the server component. The server component is configured to authorize access to the robot controllers based on the stored information on who is allowed remote access and to which of the robot controllers.

The list may further include information on a time period during which access to the robot controllers is allowed, and the server component is configured to authorize access to the robot controller based on the time period specified in the list. The list may include different time periods for different controllers and/or for different users. The server component is configured to authorize access to a robot controller during the time period specified in the list.

The server component handles authorization of remote access to all of the controllers in the system. The robot controller may always ask the server component for approval before allowing the remote computer access to the robot controller.

In this embodiment, the identifying component 10 is arranged as a separate physical unit and connected to the local network 10. The identifying component is, for example, a push button or a card reader arranged on a wall in the factory housing the robots.

The system further comprises a computer 16, for example a PC, capable of communicating with the server computer 12 via the networks. The computer 16 is capable of receiving server credentials, for example, username and password entered by a user. The computer 16 is configured to send the server credentials to the server computer 12 in order to log in to the server computer. The server computer contains a server authentication module 18 configured to receive the server credentials and to authorize actions on the server computer based on the received server credentials. The computer 16 is configured to enable a user, for example a customer, to create the list of robot controllers for which remote access is to be allowed, and to store the list in the data storage 14 on the server computer 12. The list can either be created directly on the server computer or on the local computer. If the list is created on the local computer, the list is sent to and stored on the server computer.

Figure 3:
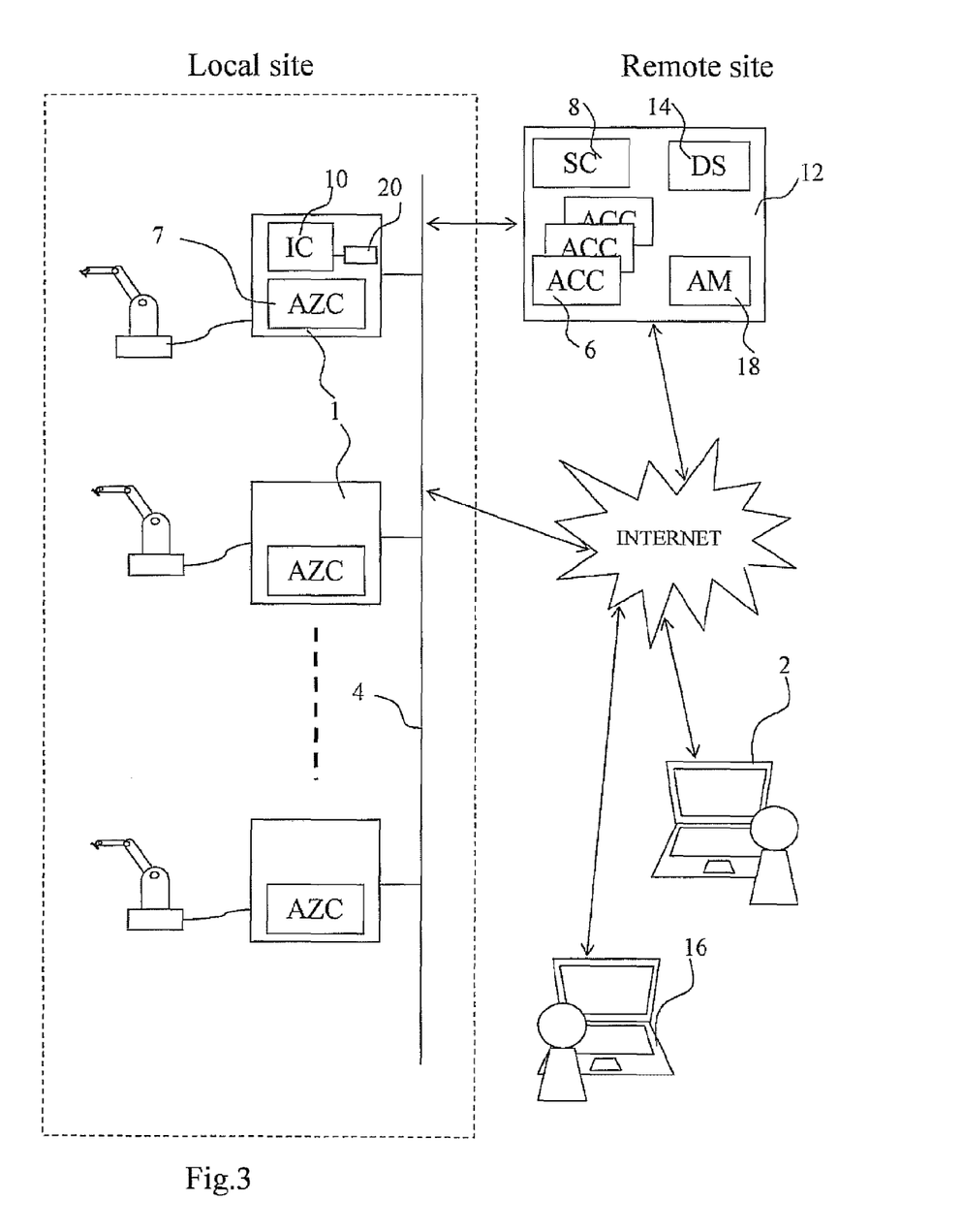
FIG. 3 shows a system for providing safe remote access according to third embodiment of the invention.

FIG. 3 shows a system for providing safe remote access according to a third embodiment of the invention. The server computer is configured to communicate with the robot controllers 1 via a second network, such as the Internet, which is connected to the local network 4. This embodiment differs from the other embodiments in that the authentication components 6 for all of the controllers are positioned on the server computer. When a robot controller receives credentials from the remote computer, the credentials are sent to the server computer and the authentication component 6 on the server computer authenticates the credentials, and sends back the result of the authentication to the controller.

This embodiment further differs from the other embodiments in that the identifying component 10 is located on one of the robot controllers 1. In this embodiment the proof of local access is received via an USB port 20 of the controller. In another embodiment, more than one of the controllers can be provided with an identifying component. In still another embodiment, all of the controllers are provided with an identifying component. In that embodiment, the server component will authorize access to robots on the list only after physical access to the required number of robot controllers on the list has been confirmed.

The computer 16 does not have to be positioned on the local site. In this embodiment the computer 16 is located outside the local site and the computer 16 is configured to communicate with the server computer 12 via the Internet.

In the following a preferred embodiment of the invention will be described. In the preferred embodiment of the invention, the local site contains multiple industrial robot controllers. The robot controllers are connected on a factory network. The factory network is in turn securely connected to other networks, such as the Business Net, or the Internet with appropriate security technologies. Typical solutions include but are not limited to firewalls, routers, VPN connections.

The robot controllers are configured to communicate with a server component. In the preferred embodiment, the server component is located on a server computer and the server computer is connected to the factory network. In other embodiments, the server computer may be located on a different network and secure communications technologies are used either between the networks (routers, firewalls, VPN tunnels), or directly between the robot controllers and the server computer (VPN tunnels, Secure Socket Layer transport, etc). The server component may also be located on any other device, such as a robot controller so long as individual robot controllers have access to the server component. Multiple server components may be used for redundancy and fallback in case of failure.

The server component is configured with knowledge of all of the robots on the local site to which remote access can be allowed. In the preferred embodiment of the invention, a person with local responsibility creates a list of robots to which a remote access is to be allowed. The person uses the computer 16 to create the list. The list is stored on the server computer. The list on the server can be created by logging into the server, using a web interface, or other tools whereby an individual with authenticated and authorized access to the server can create a list of robots to which remote access is to be allowed. In an embodiment of the invention, the server component is configured to authorize access to the robot controllers during a defined time limit. Preferably, the list also contains the time limit for access to the controllers.

The list may also include information on who is allowed remote access to the robot controllers and to which of the robot controllers access is allowed. The list may contain the credentials of the remote user who is allowed access to the controllers. In one embodiment, the server component is configured to authorize access to the robot controllers based on the information in the list on who is allowed remote access and to which of the robot controllers. In another embodiment, the authentication component is configured to authenticate the credentials in dependence on the information in the list on who is allowed access to the robot controller.

The list is digitally signed using a private key on the server using any one of known public-private key technologies. For example, the server component is configured to handle the signing of the list.

In an embodiment of the invention, a plurality of the controllers is provided with an identifying component. In that case, the list may also include the number of controllers to be locally confirmed in order to prove local access. The local user may specify one to any number of robots on the list. The server component will authorize access to robots on the list only after physical access to the specified number of the robot controllers has been confirmed.

The list on the server is then transferred to the remote computer 2 and accordingly to the remote service engineer. The transfer can be done by possible mechanisms, e-mail is a typical method, but there are many electronic and physical methods available to transfer a list from a server to a remote computer. Given that the list is digitally signed, tampering with the list is detectable and secure even if the transfer itself is insecure.

The client tool on the remote computer is configured with a User Interface requesting the signed list. In this embodiment, the signed list becomes a set of credentials for allowing remote access. In other embodiments, other credentials may be used to authenticate the remote user.

The robot controllers are equipped with an authentication component that is designed to verify the authenticity of a set of credentials for allowing remote access. In the preferred embodiment, the credentials include the list of robots to which remote access is to be allowed and the authentication component holds a copy of the server's public key.

The robot controllers are also equipped with a local identifying component. The purpose of the local identifying component is to securely verify that remote access to one or more controllers is authorized by a person who has physical and local access to one or more of the controllers.

In a preferred embodiment, the identifying component contains a copy of the server's public signing key and can authenticate a list from the server. The indentifying component looks for the presence of a signed list on a file system or memory device known to be local to the controller. When a signed list is present, the identifying component authenticates the signed list, and sends a confirmation to the server component that such a list is physically locally present.

Note that there are many possible embodiments of the identifying component. Use of a signed list is one such embodiment. Other embodiments can use User Interfaces on the controller to confirm physical local access, physical buttons on the robot or robot cell may also be used to indicate physical local access for the indentifying component.

In operation, the method according to the invention, for example, performs as follows:
1) A local user, responsible for the robot controllers works with the server component to create a list of robots to which remote access is to be allowed, and signs the list. This is, for example, done by using the computer 16.
2) The local user transfers the signed list to the remote computer 2, and accordingly to the remote user.
3) The local user takes the signed list to one or more of the controllers and activates the indentifying component. This is, for example, done by connecting a USB memory containing the signed list to the robot controller. The identifying component of the controller reads the signed list from the USB memory.
4) The identifying component on the robot controller authenticates the list and signals to the server component that physical local access has been confirmed.
5) The server component registers that physical access is confirmed.
6) The remote user connects the remote computer 2 to the factory network and starts the client tool on the remote computer.
7) The client tool requests remote user credentials and the signed list are transmitted to the authentication component of the robot controller.
8) The authentication component of the robot controller checks the signed list with the public key,
9) The authorization component of the robot controller asks server component to authorizes access to the controller,
10) The server component authorizes remote access.
11) The robot controller allows the remote client tool access to the robot controller.

In an embodiment of the invention, a plurality of the controllers is provided with an identifying component. In that case, the list may also include the number of controllers to be locally confirmed in order to prove local access.

The present invention is not limited to the embodiments disclosed but may be varied and modified within the scope of the following claims. For example, it is possible to have combinations of the embodiments disclosed in FIG. 1-3. Further, it is possible to have more than one identifying component, for example, two or more robot controllers are provided with identifying components.

What is claimed is:

1. A system providing safe remote access for control of robots positioned at a local site, the system comprising:
a plurality of robot controllers, each robot controller having an authentication component and an authorization component, the authentication component receiving and authenticating credentials for remote access, and the authorization component determining authorization for remote access to the robot controller based on a result of authentication;
a remote computer positioned at a remote site, the remote computer communicating with the robot controllers and having an interface for receiving the credentials and transmitting the credentials to the robot controllers;
a server component communicating with the robot controllers, the server component providing authorization for remote access to the authorization components of said robot controllers;
an identifying component positioned at the local site, the identifying component communicating with the server component and being configured to receive an identifier and to send information on the identifier to the server component, the identifier indicating there is local access to one or more of the plurality of robot controllers;
the server component authorizing remote access to the robot controllers based on the information on the identifier; and
the authorization component of each robot controller providing the remote computer with remote access to the robot controller when credentials have been authenticated and when remote access has been authorized by the server component.

2. The system according to claim 1, wherein the system is configured to authorize remote access to the robot controllers during a defined time limit.

3. The system according to claim 1, wherein the system is configured to not authorize remote access to the robot controllers upon receiving an order that remote access to the controllers is no longer permitted.

4. The system according to claim 1, wherein the system comprises data storage for storing a list of robot controllers to which remote access are to be allowed, and said server component is configured to authorize remote access to the robot controllers based on the information on local access received from the identifying component and the stored list of robot controllers to which remote access are to be allowed.

5. The system according to claim 4, wherein said list includes information on who is allowed remote access to the robot controllers and to which of the robot controllers remote access is allowed, and the server component is configured to authorize remote access to the robot controllers based on the information on who is allowed remote access and to which of the robot controllers.

6. The system according to claim 4, wherein for at least one of the robot controllers on said list, the list includes information on a time period during which remote access to the robot controller is allowed, and the server component is configured to authorize remote access to the robot controller based on the time period specified in the list.

7. The system according to claim 4, wherein the server component contains a server authentication module configured to receive server credentials and to authorize actions on the server component based on the received server credentials, and the system further comprises a second computer capable of communicating with the server component and capable of receiving server credentials, and the second computer is configured to send the server credentials to the server component, and capable of creating said list of robot controllers for which remote access is to be allowed and to provide the server component with the list.

8. The system according to claim 4, wherein the remote computer is configured to receive said list and to send the list to the robot controllers as credentials, and the authentication components are configured to carry out the authentication based on the received list from the remote computer.

9. The system according to claim 8, wherein the server component is configured to digitally sign the list by using a key, and the authentication component is configured to authenticate the list using the key.

10. The system according to claim 4, wherein the identifier comprises said list, and the identifying component is configured to authenticate the list and to signal to the server component that local access has been confirmed.

11. The system according to claim 10, wherein the server component is configured to digitally sign the list by using a key, and the identifying component is configured to authenticate the list using the key.

12. The system according to claim 1, wherein the identifying component is located on or in close vicinity to one of the robot controllers.

13. The system according to claim 1, wherein at least one of the robot controllers includes said identifying component and the identifying component is configured to receive the identifier from a physical interface on the robot controller.

14. A method for providing safe remote access to a plurality of robot controllers positioned at a local site through a remote computer located at a remote site, the remote computer communicating with the robot controllers, the method comprising:
    sending credentials from the remote computer to at least one of the robot controllers,
    providing authentication of the credentials,
    receiving an identifier indicative of local access to at least one of the robot controllers,
    sending information on the identifier to a server component,
    the server component authorizing remote access to the robot controllers based on the information on the identifier, and
    allowing the remote computer remote access to the robot controllers when credentials have been authenticated and when remote access to the robot controllers has been authorized.

15. The method according to claim 14, wherein remote access to the robot controllers is authorized during a defined time limit.

16. The method according to claim 14, wherein remote access to the robot controllers is not authorized upon receiving an order that remote access to the controllers is no longer permitted.

17. The method according to claim 14, wherein the method comprises:
    storing a list of robot controllers to which remote access are to be allowed,
    sending credentials from the remote computer to one of the robot controllers, and
    checking whether or not remote access is allowed to the controller based on said list, wherein remote access to the robot controller is authorized if remote access to the controller is allowed, authentication is successful, and when the identifier has been received.

18. The method according to claim 17, wherein the method comprises checking if remote access to the robot controller is to be provided through the remote computer based on said list, wherein said list includes information on who is allowed remote access to the robot controllers and to which of the robot controllers remote access is allowed.

19. The method according to claim 17, wherein said list is sent to the remote computer, the remote computer sends the list to the robot controllers as credentials, and the authentication is carried out based on the list received from the remote computer.

20. The method according to claim 17, wherein the identifier is indicative of presence of said list, and remote access to the robot controller is authorized when the list has been received and authenticated.

21. The method according to claim 17, wherein the method comprises digitally signing the list using a key, and authenticating the list using the same key.

* * * * *